Oct. 17, 1967   J. SOLOW   3,347,071
AUTOMOBILE HOOD LOCKING MEANS
Filed April 1, 1965
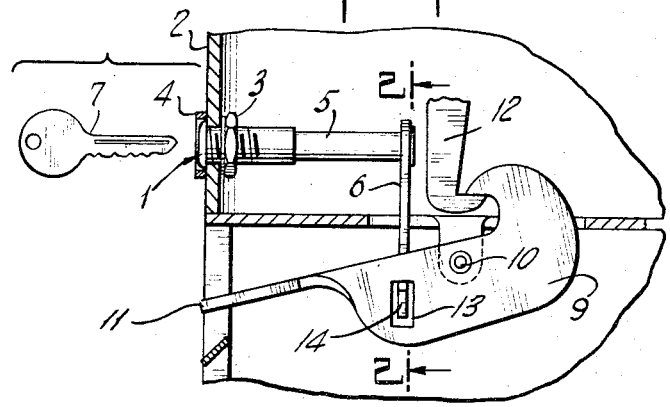
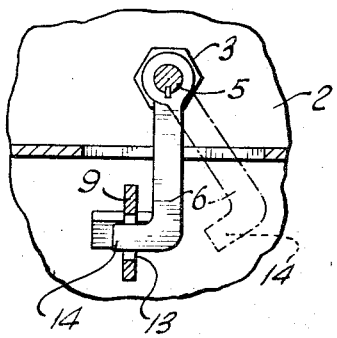
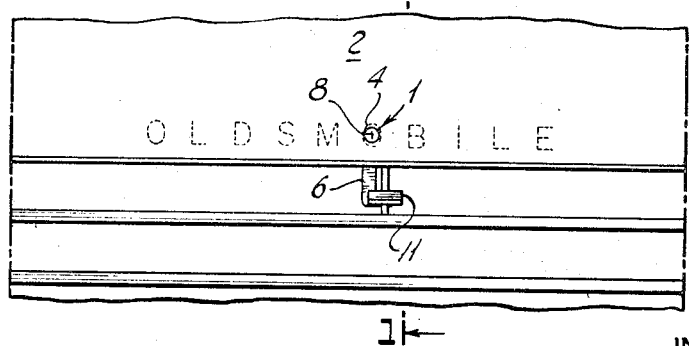
INVENTOR
JOSEPH SOLOW
BY
Lovette & Miskin
ATTORNEYS

United States Patent Office 3,347,071
Patented Oct. 17, 1967

3,347,071
AUTOMOBILE HOOD LOCKING MEANS
Joseph Solow, 1864 Coney Island Ave.,
Brooklyn, N.Y. 11230
Filed Apr. 1, 1965, Ser. No. 444,582
2 Claims. (Cl. 70—240)

ABSTRACT OF THE DISCLOSURE

Key actuated latching mechanism for selectively locking the releasable hood latching assembly of an automobile. The latching mechanism includes cylindrical lock with cylindrical casing protruding outwardly of the hood of an automobile and with the keyhole positioned outside the hood. The locking mechanism is positioned inside the hood and includes a barrel, a rotatable shank protruding from the barrel and forming an extension thereof. A latching element depending from the end of the shank is rotatable therewith. A hook on the end of the latching element is adapted to coact with a slotted lever forming part of the hood latching assembly for releasably holding the slotted lever against movement.

This invention relates to a latching mechanism for selectively locking the releasable hood latching assembly of an automobile or like vehicle.

It is the principal object of the invention to provide a locking mechanism to prevent unauthorized persons from opening an automobile hood, thereby safeguarding the automobile parts housed in the hood compartment such as a battery or other automotive components against theft and which will also prevent theft of the automobile by means of crossed ignition wires.

It is a further object of the invention to provide a locking device for automobile hood latch mechanisms which will lock the releasable hood latching assembly of the automobile by means of a cylindrical lock operated by a key in the possession of the automobile user.

It is a further object of the invention to provide a hood latch locking device which, contemplating the above objects, is of simple construction, inexpensive to manufacture, constituted by a minimum number of parts, characterized by reliability and efficiency in operation, and relatively very simple to install.

Further objects and advantages will become apparent from the following description of the invention taken in conjunction with the figures, in which:

FIG. 1 is a fragmentary side elevation partly in section taken along line 1—1 of FIG. 3 and illustrates an embodiment of the invention;

FIG. 2 is a view taken along line 2—2 of FIG. 1; and

FIG. 3 is a fragmentary front elevational view illustrating the location of the hood lock incorporating the invention in the automobile hood.

The embodiment of the invention illustrated in the figures includes a cylindrical lock 1 mounted to an automobile hood 2. Automobile hood 2 is drilled with a hole of suitable size to mount lock 1 to hood 2. A nut 3 mounted on the threaded lock barrel clamps lock 1 to hood 2. Lock 1 has a keyhole opening 8, which opening is on the outer exterior side of hood 2 to receive a key 7 for operating lock 1. The remainder of lock 1, as seen from FIG. 1, extends into the compartment enclosed by hood 2. A shank 5 is carried by and keyed to lock 1, whereby shank 5 rotates clockwise and counterclockwise, as viewed by FIG. 2, with the lock barrel mechanism in response to turning of key 7 in lock 1.

A suitably shaped latch element 6 is carried and keyed to shank 5 to turn therewith. As known in the art, the automobile hood latching assembly includes a pivotal lever 9, for example, pivoted about 10. Lever 9 has a handle end 11 protruding through the grill from the interior hood compartment. Lever 9 is usually mechanically or spring biased by means, not shown, to assume the position as illustrated in FIG. 1. For this position, the inner end of lever 9 is designed to engage and hold a second actuating part 12 of the hood latching assembly. Such engagement maintains hood 2 locked in closed status. In order to open hood 2, one manually grips lever handle 11 to pivot same in a direction to release the second hood latching assembly part 12 and to free hood 2 for opening movement. Lever 9 in the illustrative embodiment has an opening 13. The end of element 6 has a turned pawl 14 designed to enter into opening 13 to prevent manual actuation of lever 9. This holding relationship locks the hood latching assembly to prevent actuation of same to open hood 2.

In order to release the foregoing locking condition, key 7 is inserted into lock and turned. This action turns shank 5 and element 6 therewith in a corresponding manner to the phantom position of FIG. 2, thereby removing pawl end 14 from engaging lever 9. Lever 9 is now in condition to be actuated manually in order to open hood 2. Lock 1 is essentially a two-position lock, preferably designed so that its key 7 may be removed only when lock 1 is in the position which corresponds to that shown in FIG. 1, i.e., when element 6 latches lever 9 to prevent opening of hood 2.

In summary, when lock 1 is in its first status, the lock status is depicted by FIG. 1, lock barrel is rotatably conditioned whereby latching element 6 engages lever 9 to prevent manual manipulation of same so as to prevent an unauthorized opening of automobile hood 2. When lock 1 is in its second operative status, its barrel is conditioned rotationally as depicted in phantom in FIG. 2, thereby swinging latching element 6 out of holding engagement of lever 9. This now allows one to manipulate lever 9 in order to open hood 2. Since key 7 is in the possession of the automobile user, he controls opening or closing of hood 2. It is preferable, and thus an advantage and objective of the invention, to locate lock 1 as close as possible to the hood latching assembly lever 9 so that very little manual torque is required to swing latching element 6 from one to another of its two positions, as depicted in FIG. 2. As noted herein, the device is mechanically simple and reliable because it operates directly upon lever 9 of the hood latching assembly, which is designed to be manually pivoted or actuated by the automobile user. Furthermore, since the invention is designed to operate on lever 9, it may be located in the front portion of the hood near the automobile trademark symbol. For example, as illustrated in FIG. 3, the lock hole is drilled in the letter O (reference No. 4) of the word Oldsmobile to minimize and hide the presence of such a lock, which also minimizes disfiguring the decor of the hood by the mounted lock.

Furthermore, it will be understood that the shape of element 6 and the length of shank 5 will be controlled by the particular automobile since the control lever 9 for the various different automobiles may have differently shaped levers 9. The object is to provide a shank 5 of such length and shape and latching element 6 keyed thereto of such length and shape to engage and hold the hood assembly latching lever 9 for one position of lock status and to release same for the other position of lock status.

It is intended that all matter contained in the above description or shown in the accompanying drawings shall be interpreted as illustrative and not in a limiting sense.

What is claimed is:

1. In a releasable hood latching assembly having a manually pivotal lever for releasing an automobile hood in closed latch status, the combination comprising, with a hood having a hole adjacent the grille work of the automobile, of means including a cylinder lock mounted in the hole in the hood, said cylinder lock having a keyhole opening at the outerside of said hood, the remainder of said lock extending into the automobile compartment enclosed by said hood, means including a shank carried by said lock and forming an extension thereof for conditionable rotation from one to another of at least two operative positions, and a latching element keyed at one end to and carried by said shank for releasably engaging said latching assembly lever, a first selected actuation of said lock adapted to condition said shank and said latching element to one operative position for causing said element to engage said latching lever to prevent conditioning of same for unlatching said hood, a second selective actuation of said lock adapted to condition said shank and said latching element to disengage from said assembly lever for allowing manual actuation of said lever in order to unlatch said hood from closed status.

2. Apparatus as defined in claim 1 wherein said hood mounts and carries said lock adjacent said assembly pivotal lever, and a nut carried by said lock in the interior side of said hood for clamping said lock in fixed relationship to said hood.

References Cited

UNITED STATES PATENTS

| | | | |
|---|---|---|---|
| 950,471 | 3/1910 | Brown | 70—196 |
| 1,572,947 | 2/1926 | Pardoe | 70—242 |
| 1,679,026 | 7/1928 | Fekete | 70—210 |
| 1,747,092 | 2/1930 | Van Note | 70—240 |
| 3,199,322 | 8/1965 | Braun et al. | 70—240 |

BOBBY R. GAY, *Primary Examiner.*